United States Patent
Enquist

(10) Patent No.: US 6,619,892 B2
(45) Date of Patent: Sep. 16, 2003

(54) POSITIONAL ADJUSTING MECHANISM FOR A CUTTING INSERT

(75) Inventor: Lars-Erik Enquist, Sandviken (SE)

(73) Assignee: Sandvik AB, Sandviken (SE)

( * ) Notice: Subject to any disclaimer, the term of this patent is extended or adjusted under 35 U.S.C. 154(b) by 2 days.

(21) Appl. No.: 09/891,345

(22) Filed: Jun. 27, 2001

(65) Prior Publication Data

US 2002/0053266 A1 May 9, 2002

(30) Foreign Application Priority Data

Jun. 27, 2000 (SE) .............................................. 0002407

(51) Int. Cl.$^7$ ................................................. B26D 1/12
(52) U.S. Cl. ...................................................... 407/36
(58) Field of Search ............................. 407/35, 36, 37, 407/38, 39, 43, 44, 45, 47, 48, 53, 104, 113–116

(56) References Cited

U.S. PATENT DOCUMENTS

| | | | | |
|---|---|---|---|---|
| 1,736,273 A | * | 11/1929 | Miller | 407/44 |
| 3,497,934 A | * | 3/1970 | Hudson | 407/36 |
| 3,785,746 A | | 1/1974 | Wolf et al. | |
| 4,470,731 A | * | 9/1984 | Erkfritz | 407/36 |
| 4,645,383 A | * | 2/1987 | Lindsay | 407/36 |
| 4,938,638 A | * | 7/1990 | Hessman et al. | 407/38 |
| 5,291,023 A | | 3/1994 | Hasegawa et al. | |
| 5,391,023 A | * | 2/1995 | Basteck | 408/146 |
| 5,536,119 A | * | 7/1996 | Werner et al. | 407/113 |
| 6,109,838 A | * | 8/2000 | Riviere | 407/113 |
| 6,126,364 A | * | 10/2000 | Riviere | 407/15 |

FOREIGN PATENT DOCUMENTS

WO WO98/43766 10/1998

* cited by examiner

Primary Examiner—Derris H. Banks
Assistant Examiner—Bera B. Miller
(74) Attorney, Agent, or Firm—Burns, Doane, Swecker & Mathis, LLP

(57) ABSTRACT

A positional adjusting mechanism for a cutting insert in a tool for chip removing machining, preferably a milling cutter. The positional adjusting mechanism includes a hole formed in the tool body adjacent to the cutting seat which receives the cutting insert. A slotted bushing is mounted in that hole. An adjusting screw is received in the bushing to expand an upper end of the bushing. In the mounted state of the bushing in its hole, contact occurs between an upper part of the bushing and a support surface of the tool body which urges the bushing laterally in its hole to eliminate lateral play and thus stabilizes the bushing.

18 Claims, 6 Drawing Sheets

Fig. 6
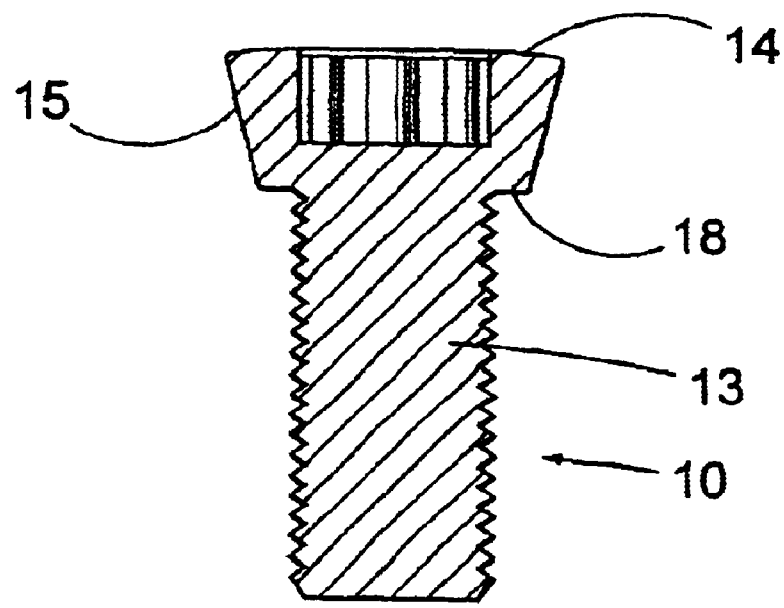
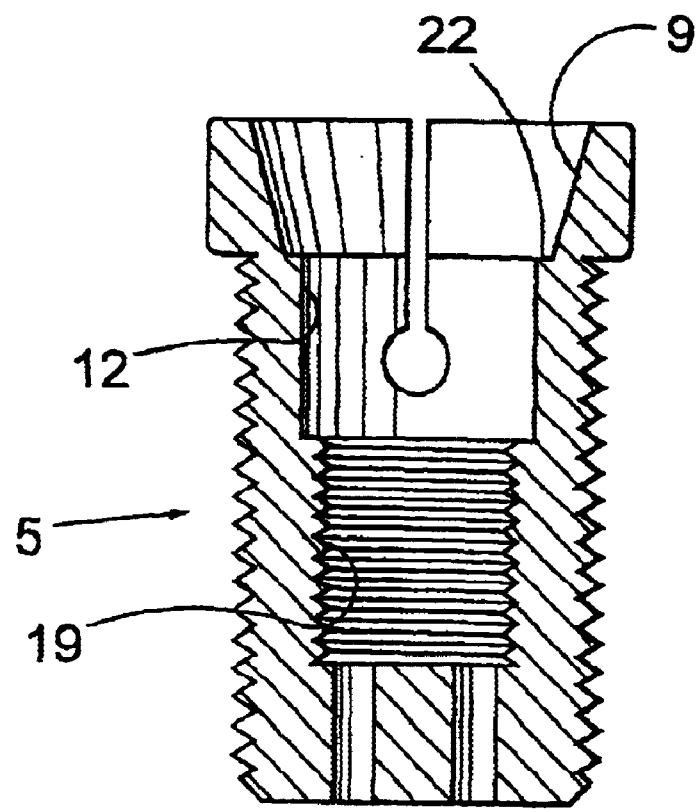

POSITIONAL ADJUSTING MECHANISM FOR A CUTTING INSERT

This application claims priority under 35 U.S.C. §§119 and/or 365 to Patent Application Ser. No. 0002407-5 filed in Sweden on Jun. 27, 2000, the entire content of which is hereby incorporated by reference.

1. Technical Field of the Invention

The present invention relates to a positional adjusting mechanism for a cutting insert in a tool for chip removing machining, preferably a milling cutter, which positional adjusting mechanism comprises a first hole recessed in the tool body in connection with a cutting seat for the cutting insert, a slotted bushing mounted in said hole as well as an adjusting screw received in said bushing. The invention also relates to a tool, which is provided with a positional adjusting mechanism according to the present invention.

2. Prior Art

An adjustable stop for a cutting insert is previously known from International Publication WO 98/43766, said stop comprising a slotted stop body in the upper part thereof, which is provided with a laterally protruding tongue, the free end of which constitutes a stop face. The adjustable stop furthermore comprises a bushing mounted inside the stop body, which has an internal thread intended to cooperate with an adjusting screw that is threaded in the bushing, and the head of which cooperates with the upper slotted part of the stop body, whereby a lateral displacement is provided by the stop face on the laterally protruding tongue, said stop face affecting the cutting insert and causing adjustment of the position thereof. Thus, this known stop comprises at least three separate components. Furthermore, the slotted stop body is unsymmetrical, which means that it has to be mounted by means of a separate clamping part. An additional disadvantage is that there is a play between the stop body and the bushing, which is of disadvantage with respect to the precision of the system.

A machine reamer which has a positional adjusting mechanism for a cutting insert is previously known from U.S. Pat. No. 5,391,023. In that patent, a slotted bushing is received in a tool body, there being play between said bushing and said tool body. This is disadvantageous to the precision of the system. The bushing is secured in a hole in the tool body by means of press-fit, which means that said bushing is only locked against rotation by the friction between the bushing and the hole. Nor is the bushing secured against axial movement that may be caused by high centrifugal forces in connection with high rotational speeds.

SUMMARY AND OBJECTS OF THE INVENTION

A primary object of the present invention is to provide a positional adjusting mechanism of the kind defined in the introduction, which can adjust the position of the cutting insert with exceptionally high precision.

Another aim of the present invention is that the positional adjusting mechanism should comprise as few components as possible as well as in other respects be structurally simple.

Yet a further aim of the present invention is that: (i) the components included in the positional adjusting mechanism should be anchored in relation to forces acting on the tool, and (ii) the tool should be balanced irrespective of the adjustment of the positional adjusting mechanism.

An additional aim of the present invention is that the positional adjusting mechanism should be well defined, i.e., rigid, in order to obtain maximum repetitive accuracy when installing the cutting inserts included in the tool.

At least the primary the aim of the present invention is realized by means of a positional adjusting mechanism in which a bushing is stabilized against its mounting hole upon being installed.

BRIEF DESCRIPTION OF THE DRAWINGS

The objects and advantages of the invention will become apparent from the following detailed description of preferred embodiments thereof in connection with the accompanying drawings in which like numerals designate like elements, and in which:

FIG. 6 shows a side view of the tubular screw and adjusting screw according to FIG. 5, also in positions separated from each other.

DETAILED DESCRIPTION OF PREFERRED EMBODIMENTS OF THE PRESENT INVENTION

Figure 1:
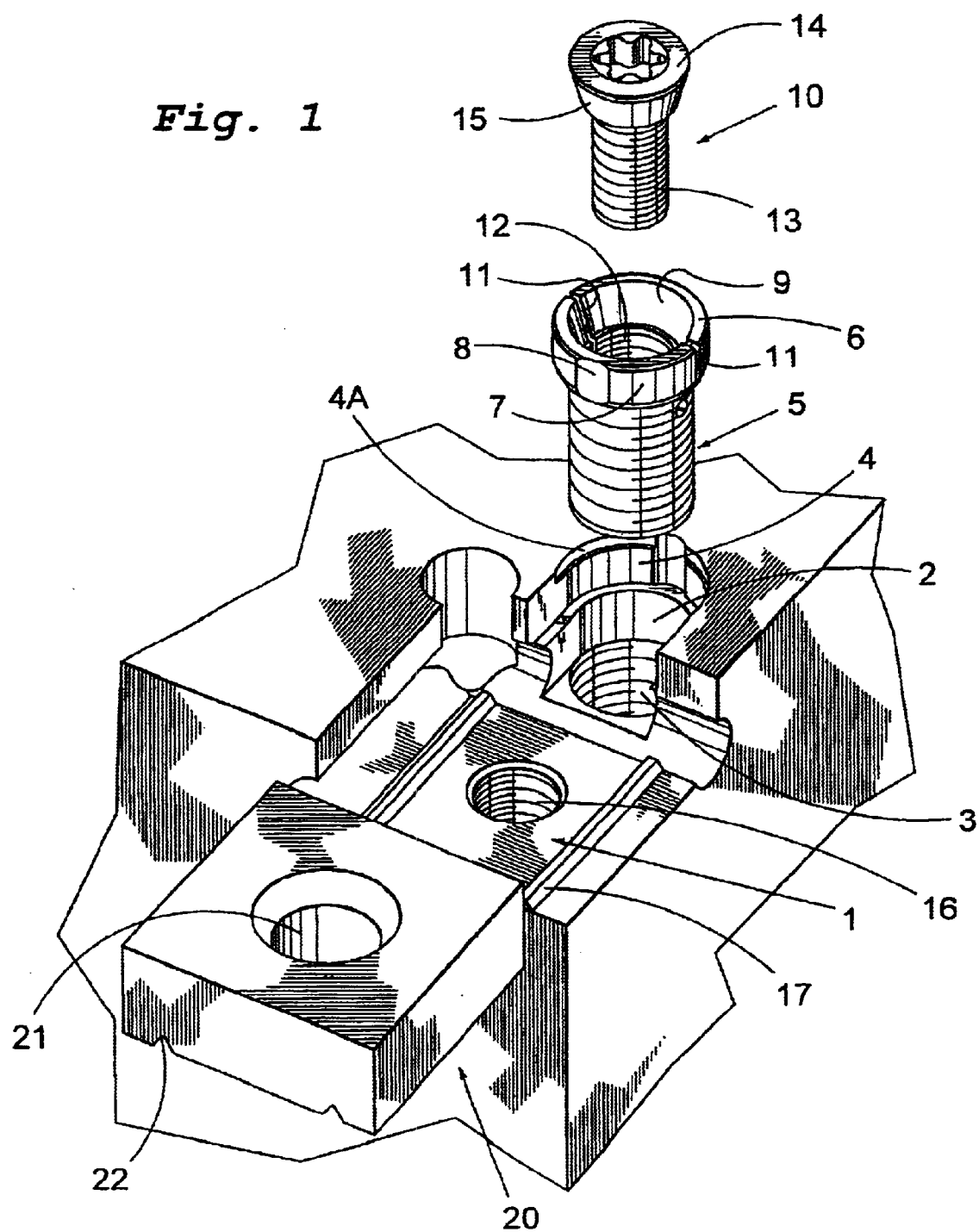
FIG. 1 shows an exploded view in perspective of the components included in a preferred embodiment of a positional adjusting mechanism according to the present invention, a cutting insert and a cutting seat of the milling body being illustrated separated from each other; and the cutting insert provided with grooves while the cutting seat is provided with ridged teeth.

FIG. 1, a cutting seat 1 of a milling cutter is shown, a first cylindrical hole 3 being arranged adjacent to said cutting seat 1. As is indicated in FIG. 1, a generally cylindrical threaded bushing 5 is intended to be mounted in said first hole 3, whereby the assembly of the threaded bushing 5 may take place thanks to the threaded bushing 5 being provided with an external thread, which cooperates with an internal thread of the first hole 3. The threaded bushing 5 is, at the slotted upper end thereof in FIG. 1, provided with a collar 6, which has an external cylindrical surface 7 having a diameter larger than the external diameter of the rest of the threaded bushing 5. On the external cylindrical surface 7, two diametrically situated facets 8 are arranged, only one of which being seen in FIG. 1. On the inside thereof, the collar 6 has a conical surface 9, which is intended to cooperate with an adjusting screw 10 included in the positional adjusting mechanism according to the present invention, which will be explained more in detail below.

As is seen in FIG. 1, the threaded bushing 5 has in the upper part thereof two diametrically situated, axially running slots 11, which plays a large part during the adjustment which is carried out by the positional adjusting mechanism according to the present invention. The slots separate the collar into first and second collar portions 6A, 6B, each having one of the facets 8. The threaded bushing 5 also has an internal cylindrical recess 12 as well as an internal thread 19 situated axially farther away from the collar 6, which thread is not seen in FIG. 1 but in FIGS. 5 and 6.

The adjusting screw 10 comprises a shank which is provided with an external thread 13 as well as a head 14, which is provided with an external conical surface 15. The external thread 13 of the adjusting screw 10 is intended to cooperate with the internal thread 19 of the threaded bushing 5 while the external conical surface 15 of the adjusting screw 10 is intended to cooperate with the internal conical surface 9 of the threaded bushing 5. This will be described in more detail below.

Figure 2:
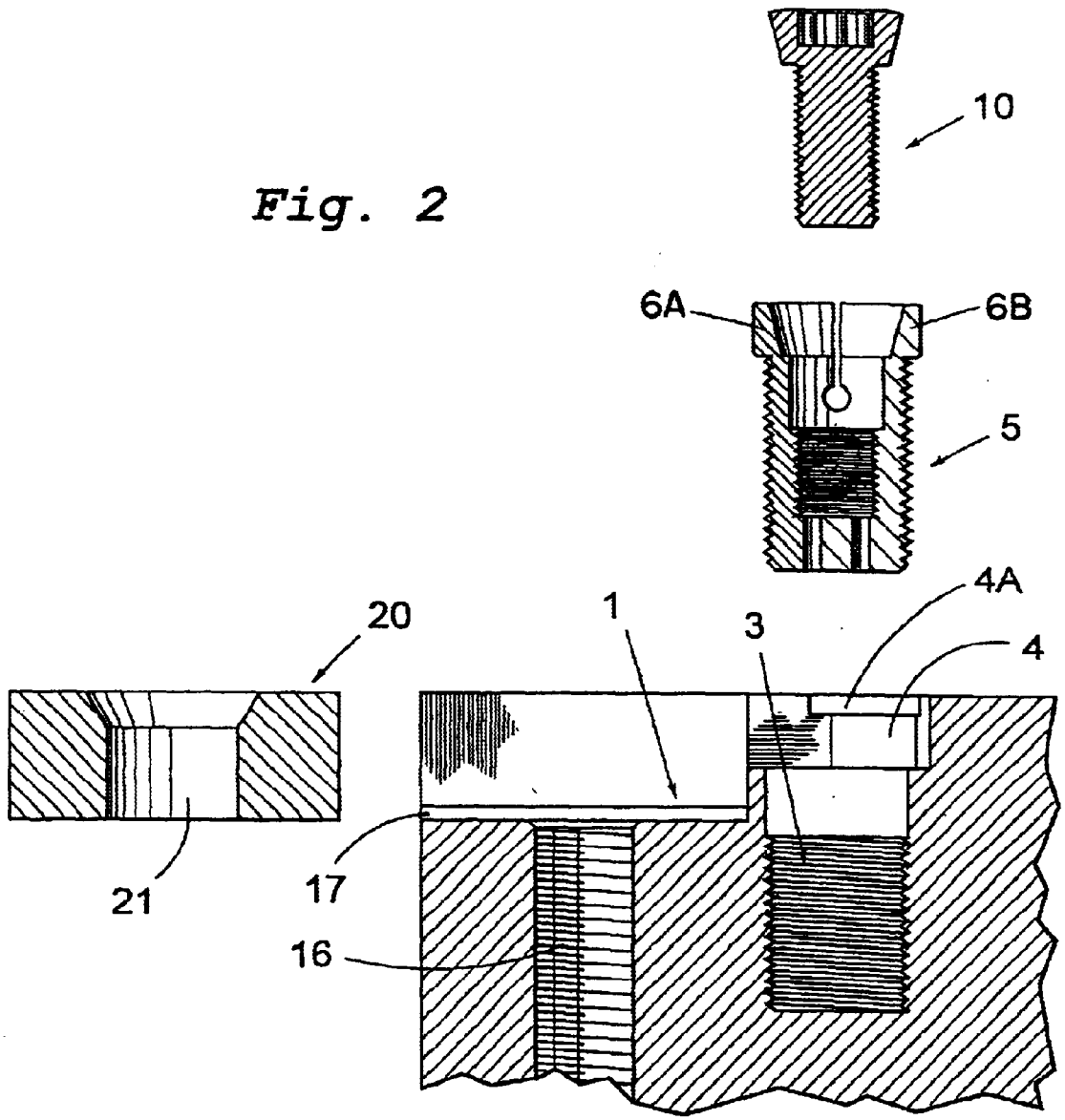
FIG. 2 shows an exploded view from the side of the components/parts illustrated in FIG. 1.

As can be seen in FIGS. 1 and 2, a floor of the cutting seat 1 is provided with a hole 16, which is internally threaded, as well as ridged teeth, or ridge 17, which according to the illustrated embodiment are two in number. The cutting seat 1 is intended to receive a cutting insert 20 for chip removing machining, said cutting insert 20 being provided with a third hole 21 as well as grooves 22 on the bottom side thereof, which according to the illustrated embodiment are two in number and intended to cooperate with the ridged teeth 17 of the cutting seat 1 to form a guide structure which guides the adjustment movement of the insert.

Figure 3:
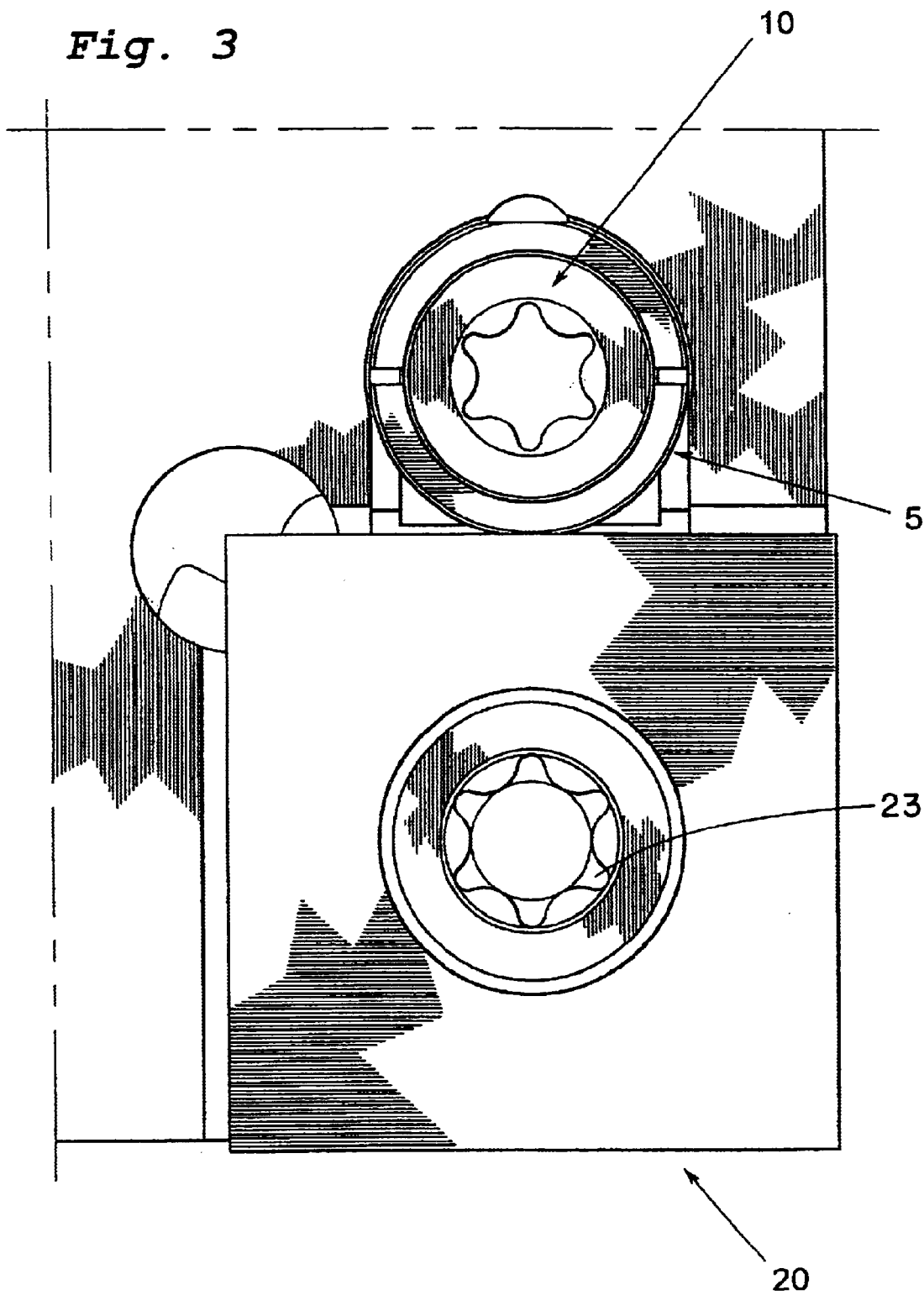
FIG. 3 shows a plan view of the positional adjusting mechanism according to the present invention as well as a cutting insert, which is effected by said positional adjusting mechanism.

The planar view according to FIG. 3 shows the position when the threaded bushing 5 is mounted in the first hole 3 and the adjusting screw 10 is mounted in the threaded bushing 5. The mounting of the threaded bushing 5 in the first hole 3 is performed such that the diametrically situated facets 8 of the threaded bushing 5 are so oriented that one of the facets 8 faces the seat 1 and thus will abut against a side of the insert once the insert is installed, thereby preventing the bushing 5 from rotating while the adjusting screw 10 is being inserted. Also, the adjustment force which displaces the cutting insert 20 will be directed parallel to (or nearly parallel to) the ridged teeth 17 as will be explained. The arrangement of the surfaces adjacent to the hole 3 are such that when mounting the threaded bushing 5 in the hole 3, the threaded bushing 5 is urged laterally which eliminates any thread play between the hole 3 and the threaded bushing 5 which may have otherwise tended to occur. As is seen in FIGS. 1 and 2, a transition surface portion 2 is arranged above the threaded hole 3, which portion has such a radius that said transition portion 2 will not abut against the outside of the threaded bushing 5 but rather there will be a small gap between the transition portion 2 and the threaded bushing 5. Above the transition portion 2, a support surface 4 is arranged, which is provided with a chamfer 4A. The support surface 4 has a radius that in principle equals the radius of the collar 6 of the threaded bushing 5. The axis of the support surface 4 is offset in relation to the axis of the hole 3, i.e. the center axis of the hole 3 does not coincide with the center of the support surface 4. More precisely, the axis of the surface 4 is offset slightly to the left of the axis of the hole 3 in FIG. 2, so that when the threaded bushing 5 is threaded into the hole, the portion 6B of the collar 6 comes into abutment against the support surface 4 and is urged laterally toward the seat 1. The chamfer 4A ensures that the collar portion 6B is properly guided into contact with the support surface 4 so that in the assembled state of the threaded bushing 5, the surfaces 7 and 4 will abut against each other with a force which ensures that an offset of the bushing 5 is obtained that eliminates radial play between the bushing 5 and the hole 3.

Figure 4:
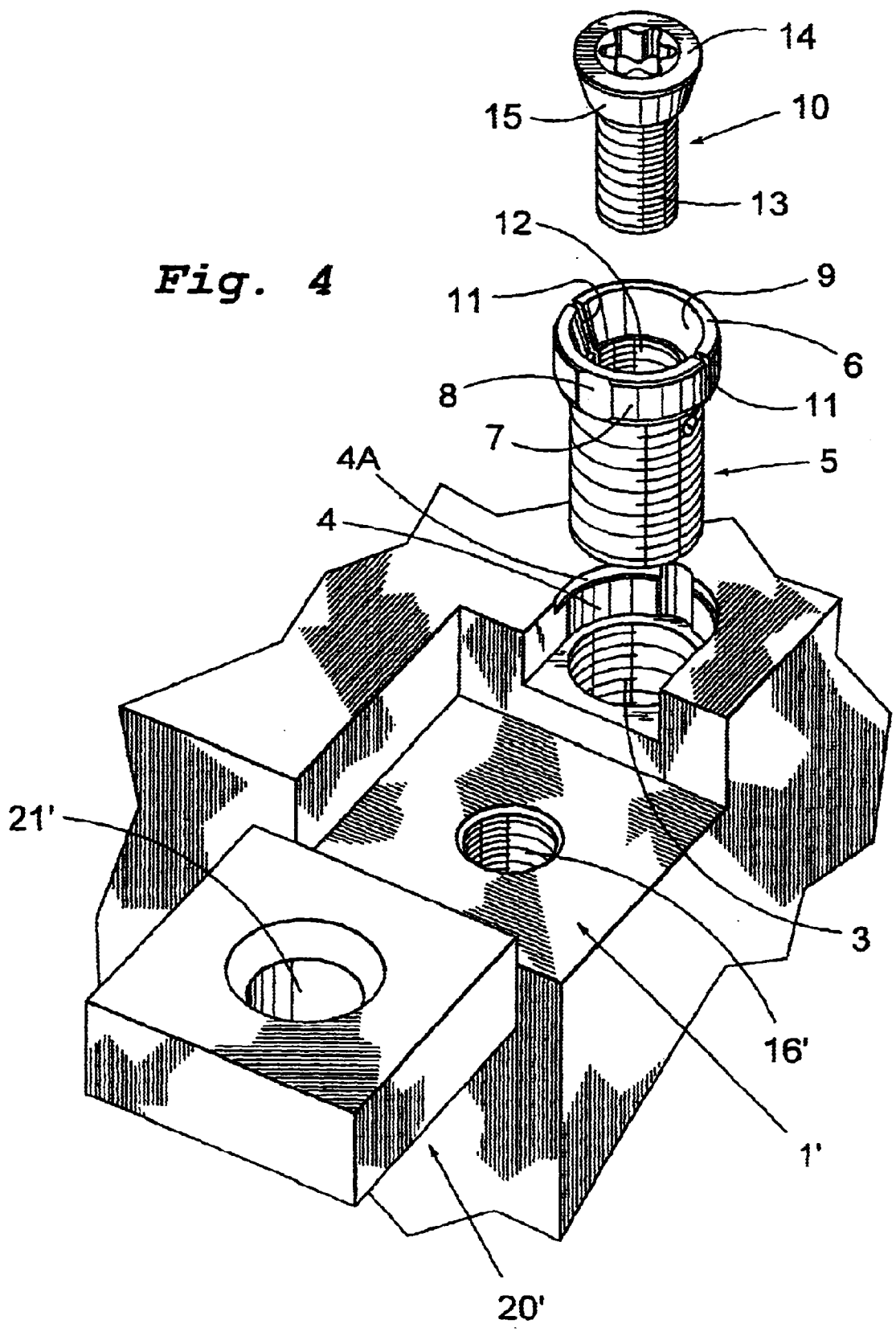
FIG. 4 shows a modified tool in an exploded view similar to FIG. 1, the cutting seat and the cutting insert, however, lacking ridged teeth and grooves, respectively.

FIG. 4 shows a corresponding perspective view as in FIG. 1, but the cutting seat 1', does not have any ridged teeth and the cutting insert 20', is not provided with any grooves. The components included in the positional adjusting mechanism are in principle identical with the components illustrated in FIG. 1, and therefore said components in FIG. 4 have received the corresponding reference numerals as in FIG. 1.

Figure 5:
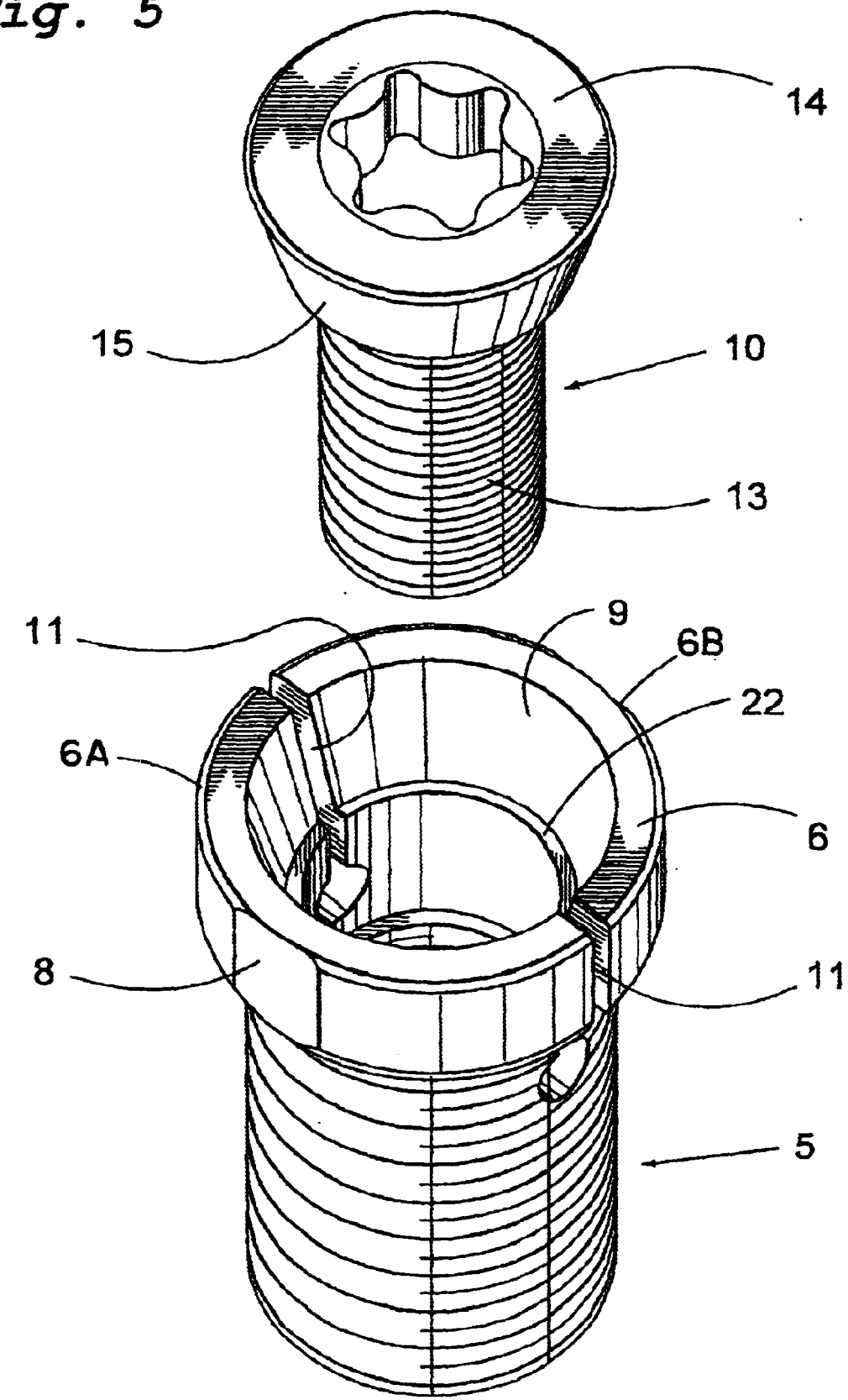
FIG. 5 shows a perspective view of a bushing and an adjusting screw in positions separated from each other.

In FIGS. 5 and 6 the threaded bushing 5 as well as the adjusting screw 10 are shown more in detail. In that connection, it should be pointed out that the adjusting screw 10 in the transition between the external thread 13 and the external conical surface 15 of the head 14 has a downwardly facing first stop face 18. The threaded bushing 5 is provided with an upwardly facing second stop face 22 in the transition between the internal cylindrical recess 12 and the internal conical surface 9. The threaded bushing 5 and the adjusting screw 10 cooperate in such a way that initially the external thread 13 of the screw 10 engages the internal thread 19 of the threaded bushing 5. Then, the external conical surface 15 of the screw 10 comes into abutment against the internal conical surface 9 of the threaded bushing 5. During this stage, the two portions of the collar that are separated by the slots 11 are wedged apart, i.e., an expansion of the slots 11 takes place. Thus, the portion 6B of the collar is displaced radially (laterally) toward the insert, causing the facet 8 thereof to abut against the cutting insert 20. Thereby, also a displacement of the cutting insert 20 will take place within the plane of the insert, e.g., in a direction parallel to the ridged teeth 17, or at a slight angle relative to those teeth. In spite of the cutting insert 20 being anchored in the cutting seat 1 by means of a center screw 23 (see FIG. 3) which is attached within the hole 16, it is possible for a slight displacement of the cutting insert 20 to take place, i.e., an exceptionally small displacement, more precisely on the order of 0.001–0.1 mm.

Once the first stop face 18 of the screw 10 comes into abutment against the second stop face 22 of the threaded bushing 5, additional adjustment of the insert cannot take place. In this context, it should be pointed out that the positional adjusting mechanism according to the present invention preferably is optimized in such a way that the stop faces 18 and 22 come to abutment against each other before the collar 6 has been widened so much that a permanent deformation thereof remains.

In cases where the cutting seat 1' and the cutting insert 20' are not provided with ridged teeth and grooves, respectively (see FIG. 4), a displacement of the cutting insert 20, will anyway take place in the direction away from the threaded bushing 5, but this displacement will not be equally well-defined, as regards its direction of displacement, due to the lack of guidance provided by ridged teeth and cooperating grooves. In this connection, it should be pointed out that the present invention thus does not require the presence of ridged teeth and grooves, even if it is the most preferred embodiment.

Characteristic of the two above-described embodiments is that when used in a milling tool made with a radial location of the positional adjusting mechanism and the cutting insert, the position of the center of gravity of the tool is not effected when the positional adjusting mechanism causes a displacement of the cutting insert. This is of great importance when the tool is used at high rotational speeds, since the sensitivity to forces, which are caused by imbalance, is especially large at high rotational speeds. Feasible Modifications of the Invention In the above-described embodiments, the adjusting screw 10 cooperates with a threaded bushing 5. However, it is feasible within the scope of the present invention that a bushing is used instead of the threaded bushing, e.g., a bushing that is secured in the first hole 3 by means of press fit. In this connection, it should be pointed out that in such a case, the bushing does not necessarily need to be rotationally symmetrical. Within the scope of the invention, it is, for instance, alternatively possible that the bushing is secured in the first hole 3 by means of some type of bayonet fitting, the bushing in such a case being rotationally symmetrical. It will be appreciated that as used herein, the term "bushing" covers all of the above-described types of bushings.

In the embodiment according to FIGS. 1–3, two ridged teeth 17 are arranged in the cutting seat 1 while in the embodiment according to FIG. 4 ridged teeth are lacking in the cutting seat 1'. However, within the scope of the present invention it is also feasible that the number of ridged teeth in the cutting seat in principle may vary freely within what is functionally and practically possible.

In the embodiment according to FIGS. 1–3, ridged teeth 17 are arranged in the cutting seat 1 while grooves 22 are arranged at the bottom side of the cutting insert 20. However, within the scope of the present invention it is also possible that the cutting seat 1 be provided with grooves and that the cutting insert 20 has ridged teeth. Also in this case, of course, the number of grooves and ridged teeth may vary within the scope of what is functionally and practically possible.

What is claimed is:

1. A tool for chip removing machining, comprising:
    a tool body including a seat for receiving a cutting insert;
    a first hole formed in the tool body adjacent the seat, and a support surface formed in the tool body adjacent and above the seat;
    an insert-adjusting bushing mounted in the first hole and including a second hole therein, the bushing having a slotted upper end including a first bushing portion facing the seat and a second bushing portion facing the support surface;
    the support surface arranged to abut the second bushing portion and urge the bushing in a direction laterally relative to an axis of the first hole to eliminate lateral play between the bushing and the first hole, thereby stabilizing the bushing; and
    an adjusting screw mounted in the second hole for displacing the first portion of the stabilized bushing toward the insert seat;
    wherein the support surface is arranged to abut the second bushing portion and stabilize the bushing independently of the displacement of the first portion of the bushing toward the insert seat by the adjusting screw.

2. The tool according to claim 1 wherein the slotted upper end of the bushing comprises a slotted collar of enlarged diameter wherein the first and second bushing portions constitute first and second collar portions, respectively.

3. The tool according to claim 2 wherein the axis of the first hole constitutes a first axis, the support surface being concavely curved and including a second axis arranged substantially parallel to the first axis and spaced from the first axis in a direction away from the support surface.

4. The tool according to claim 3 further including a chamfer disposed in the tool body at an upper end of the support surface for guiding the collar of the bushing downwardly into engagement with the support surface during installation of the bushing.

5. The tool according to claim 1 wherein the slotted upper end of the bushing includes two diametrically opposed, aligned slots disposed on opposite sides of the second hole.

6. The tool according to claim 2 wherein an outer surface of the collar includes cylindrical segments spaced apart by diametrically opposed facets one of the facets facing the seat.

7. The tool according to claim 1 wherein an upper end of the second hole is generally conically shaped, the adjusting screw including a head having a conical surface engaging the conically shaped surface of the second hole for wedging apart the first and second bushing portions.

8. The tool according to claim 7 wherein the adjusting screw includes a downwardly facing fist stop face, and the second hole of the bushing includes an upwardly facing second stop face arranged to be contacted by the first stop face to limit an extent to which the first and second bushing parts can be wedged apart.

9. The tool according to claim 1 wherein a lower end of the bushing is externally screw-threaded, and the first hole is internally screw-threaded.

10. The tool according to claim 1 wherein a floor of the insert seat includes a third hole for receiving an insert fastener, an axis of the third hole extending substantially parallel to the axis of the first hole.

11. The tool according to claim 1 wherein the axis of the first hole constitutes a first axis, the support surface being concavely curved and including a second axis arranged substantially parallel to the first axis and spaced from the first axis in a direction away from the support surface.

12. The tool according to claim 1 further including a cutting insert mounted in the seat and engaged by the first bushing portion.

13. The tool according to claim 12 wherein the insert rests upon a floor of the seat, the floor of the seat and a bottom side of the insert together forming a guiding structure for guiding movement of the insert under the urging of the bushing.

14. The tool according to claim 13 wherein the guiding structure comprises a ridge-and-groove arrangement.

15. A method of mounting an adjustable cutting insert of a tool for chip removing machining, comprising the steps of:
    A) inserting a bushing into a first hole of a tool body such that a first bushing portion at an upper end of the bushing faces an insert seat of the tool body and a second bushing portion at the upper end of the bushing engages a support surface situated above and adjacent to the first hole such that the bushing is urged by such engagement in a direction extending laterally of an axis of the first hole to stabilize the bushing;
    B) attaching a cutting insert to the insert seat; and
    C) advancing an adjusting screw within a second hole formed in the stabilized bushing to wedge apart the first and second bushing portions, whereupon the first bushing portion laterally displaces the cutting insert;
    D) wherein the engagement of the first bushing portion with the support surface in step A occurs independently of the wedging apart of the first and second bushing portions in step C.

16. A tool for chip removing machining, comprising:
    a tool body including a seat for receiving a cutting insert;
    a first hole formed in the tool body adjacent the seat, and a support surface formed in the tool body adjacent and above the seat;
    an insert-adjusting bushing mounted in the first hole and including a second hole therein, the bushing having a slotted upper end including at least a first bushing portion facing the seat and a second bushing portion facing the support surface;
    the support surface arranged to abut the second bushing portion and urge the bushing in a direction laterally relative to an axis of the first hole to eliminate lateral play between the bushing and the first hole, thereby stabilizing the bushing; and
    an adjusting screw mounted in the second hole for displacing the first portion of the stabilized bushing toward the insert seat;
    wherein the slotted upper end of the bushing comprises a slotted collar of enlarged diameter wherein the first and second bushing portions constitute first and second collar portions, respectively;

wherein the axis of the first hole constitutes a first axis, the support surface being concavely curved and including a second axis arranged substantially parallel to the first axis and spaced from the first axis in a direction away from the support surface; and a chamfer disposed in the tool body at an upper end of the support surface for guiding the collar of the bushing downwardly into engagement with the support surface during installation of the bushing.

17. A tool for chip removing machining, comprising:

a tool body including a seat for receiving a cutting insert;

a first hole formed in the tool body adjacent the seat, and a support surface formed in the tool body adjacent and above the seat;

an insert-adjusting bushing mounted in the first hole and including a second hole therein, the bushing having a slotted upper end including at least a first bushing portion facing the seat and a second bushing portion facing the support surface;

the support surface arranged to abut the second bushing portion and urge the bushing in a direction laterally relative to an axis of the first hole to eliminate lateral play between the bushing and the first hole, thereby stabilizing the bushing; and an adjusting screw mounted in the second hole for displacing the first portion of the stabilized bushing toward the insert seat;

wherein the slotted upper end of the bushing comprises a slotted collar of enlarged diameter wherein the first and second bushing portions constitute first and second collar portions, respectively;

wherein an outer surface of the collar includes cylindrical segments spaced apart by diametrically opposed facets, one of the facets facing the seat;

wherein the guiding structure comprises a ridge-and-groove arrangement.

18. A tool for chip removing machining, comprising:

a tool body including a seat for receiving a cutting insert;

a first hole formed in the tool body adjacent the seat, and a support surface formed in the tool body adjacent and above the seat;

an insert-adjusting bushing mounted in the first hole and including a second hole therein, the bushing having a slotted upper end including at least a first bushing portion facing the seat and a second bushing portion facing the support surface;

the support surface arranged to abut the second bushing portion and urge the bushing in a direction laterally relative to an axis of the first hole to eliminate lateral play between the bushing and the first hole, thereby stabilizing the bushing;

an adjusting screw mounted in the second hole for displacing the first portion of the stabilized bushing toward the insert seat; and a cutting insert mounted in the seat and engaged by the first bushing portion, wherein the insert rests upon a floor of the seat, the floor of the seat and a bottom side of the insert together forming a guiding structure for guiding movement of the insert under the urging of the bushing;

wherein the guiding structure comprises a ridge-and-groove arrangement.

* * * * *